United States Patent
Noguchi

[11] 3,936,138
[45] Feb. 3, 1976

[54] METHOD OF RECONSTRUCTING HOLOGRAMS USING A REFLECTED UNDIFFRACTED BEAM AS A RECONSTRUCTION BEAM

[75] Inventor: Masaru Noguchi, Minami-ashigara, Japan

[73] Assignee: Fuji Photo Film Co., Ltd., Minami-ashigara, Japan

[22] Filed: July 16, 1974

[21] Appl. No.: 488,945

[30] Foreign Application Priority Data
July 18, 1973    Japan.................................. 48-81549

[52] U.S. Cl. ............................. 350/3.5; 350/162 SF
[51] Int. Cl.² ........................ G03H 1/24; G03H 1/30
[58] Field of Search .......... 350/3.5, 162 SF; 353/30, 353/31, 34, 37; 352/69, 70

[56] References Cited
UNITED STATES PATENTS

| | | | |
|---|---|---|---|
| 1,869,275 | 7/1932 | Planer..................................... | 353/30 |
| 2,898,804 | 8/1959 | Ragan..................................... | 353/30 |
| 2,927,508 | 3/1960 | Hoch ....................................... | 352/70 |
| 3,522,979 | 8/1970 | Wuerker............................. | 350/3.5 |
| 3,578,846 | 5/1971 | Chen ............................... | 350/162 SF |
| 3,632,182 | 1/1972 | Sincerbox ............................ | 350/3.5 |
| 3,653,067 | 3/1972 | Anderson et al. .................... | 350/3.5 |

OTHER PUBLICATIONS

Mandel, Journal of the Optical Society of America, Vol. 55, No. 12, Dec., 1965, p. 1697.
Tait et al., IBM Tech. Disclosure Document, Vol. 11, No. 12, May, 1969, p. 1636.

*Primary Examiner*—Ronald J. Stern
*Assistant Examiner*—Jon W. Henry
*Attorney, Agent, or Firm*—Fleit & Jacobson

[57] ABSTRACT

A plurality of holograms carrying equivalent information are arranged so that the undiffracted beam passing through the first hologram is used as a reconstructing beam to illuminate the second hologram, and the undiffracted beam of the second is used as a reconstructing beam for illuminating the third and so on to obtain a single bright image constituted by a plurality of perfectly overlapped images. Another embodiment of the invention employs a plurality of holograms carrying information corresponding to different parts of an object in which the undiffracted beam passing through the $i$-th hologram is used to illuminate the $(i+1)$-th hologram as a reconstructing beam.

5 Claims, 6 Drawing Figures

METHOD OF RECONSTRUCTING HOLOGRAMS USING A REFLECTED UNDIFFRACTED BEAM AS A RECONSTRUCTION BEAM

BACKGROUND OF THE INVENTION

1. Field of the Invention

This invention relates to a method of reconstructing holograms, and more particularly to a method of reconstructing information by use of holography wherein the reconstruction efficiencies are enhanced in the reconstruction process of holography.

2. Description of the Prior Art

An object beam from an object which is illuminated with spatially coherent monochromatic illumination light and a reference beam directly obtained from the same light source of the illumination light produce an interference pattern on a photographic emulsion coated recording medium. This interference pattern recorded on the photographic recording medium is known as a hologram. In reconstructing the object information, a virtual image of the object is formed by use of a reconstructing beam having the same wavefront as that of the reference beam used in the recording process or a real image of the object is formed by use of a reconstruction beam having a conjugate wavefront with respect to that of the reference beam. The reconstruction process can be explained as a process in which the reconstructing beam is diffracted by the interference pattern recorded in the hologram and the object information is reconstructed in the first-order diffraction beams.

In the reconstruction process of holography as described above, there is the great defect that the ratio of the energy carried by the first-order diffraction beam containing object information to the whole energy of the reconstructing beam which is called "first-order diffraction efficiency" is small so that a large amount of energy is wasted as the zero-order diffraction beam passes straight through the hologram. Therefore, the image information of the object reconstructed through the holographic reconstruction process generally lacks in brightness, and accordingly, the applications of the recording and reconstruction of information by use of holography are limited.

In order to overcome the defect inherent in the above described holographic method in which the interference pattern is recorded on the medium in the form of an optical density pattern, it has been known to make a phase-only hologram in which the interference pattern is recorded in the form of a phase shift pattern. Various recording media have been used for recording the phase shift pattern. The conventional photographic emulsions can also be used for recording the phase shift pattern. In this case, developed absorptive emulsions carrying an interference pattern in the form of difference in absorption between the gelatin and silver particles are bleached to convert the silver particles to a silver salt such as silver halide. Thus, the interference pattern is recorded in the emulsion in the form of difference in the refractive index between the gelatin and silver salt. The first-order diffraction efficiency of the reconstruction of this kind of hologram, however, is about 30 percent at most even in case of reconstructing a hologram which carries information corresponding to a single point. Therefore, in the reconstruction of a normal object which carries information corresponding to an infinite number of points, the above efficiency is generally several percent.

Besides photographic emulsions, dichromated sensitized gelatin, photopolymer recording medium such as photosensitive resist, and electrooptic crystals such as lithium niobate have been used for recording the phase-only hologram. However, the dichromated sensitized gelatin is disadvantageous in that its life is short, the photosensitive resist is disadvantageous in that its sensitive wavelength is limited in the range of 200 to 500 m$\mu$, and the lithium niobate has a great defect in that its sensitivity is extremely low. In view of these defects, there is still a need to find proper materials for recording the phase-only hologram.

SUMMARY OF THE INVENTION

In light of the foregoing observations and description of the conventional method of reconstructing holograms, it is the primary object of the present invention to provide a method of reconstructing holograms which has a large reconstruction efficiency.

Another object of the present invention is to provide a method of reconstructing holograms wherein the holographic image reconstructed is markedly bright.

In accordance with one embodiment of the present invention, a plurality of holograms which are substantially equivalent to each other are used to reconstruct a single bright holographic image. The zero-order diffraction beam passing straight through the first hologram is used as the reconstructing beam of the second hologram, and the undiffracted beam of the second hologram is used as the reconstructing beam of the third hologram and so on. The first-order diffraction beams of the plurality of holograms are directed to a single point to form a single holographic image there.

PREFERRED EMBODIMENTS OF THE INVENTION

Figure 1:
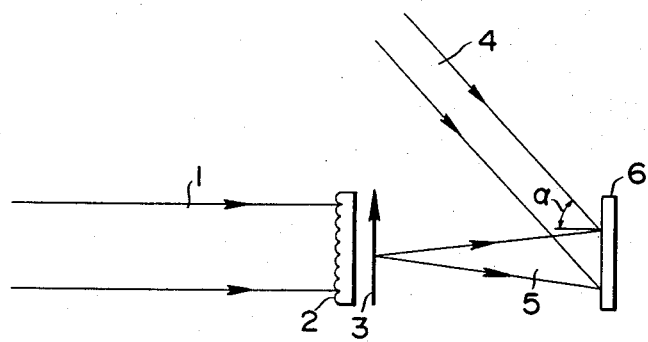
FIG. 1 is a schematic representation of an optical system for recording a hologram used in the first embodiment of this invention.
Figure 2:
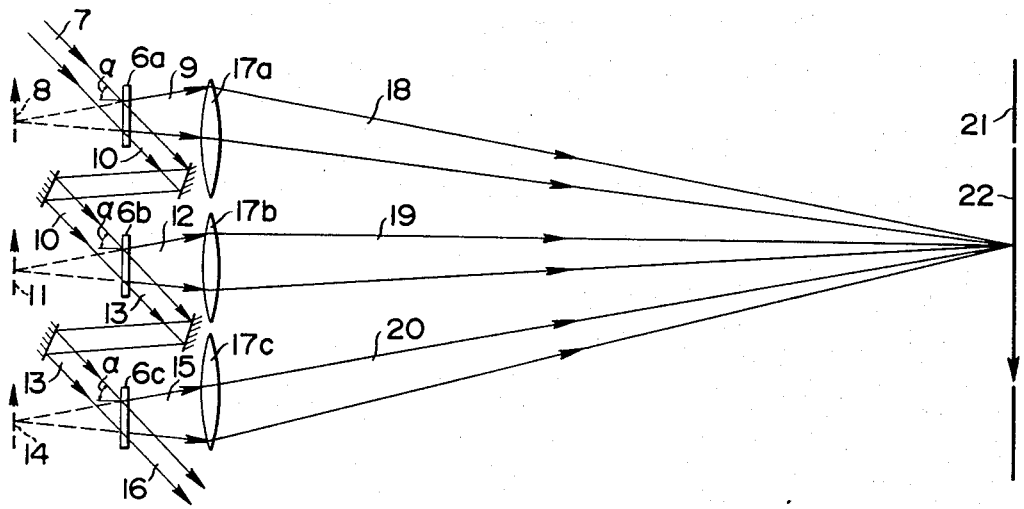
FIG. 2 is a schematic representation of an optical system for reconstructing a holographic image in accordance with the first embodiment of the present invention.

An optical system used for recording a plurality of equivalent holograms is illustrated in FIG. 1. A spatially coherent monochromatic light beam emerges from a laser source (not shown) is divided into two beams by a beam splitter (not shown). One beam 1 transmits through and is diffused by a light diffusion element 2 of a material such as a ground glass and serves to illuminate a transparency type object 3. The other light beam 4 is used as a collimated reference beam which impinges on a hologram recording medium 6 at an angle α. Since the reference beam 4 and the object beam 5 coming from the object are coherent with each other, an interference pattern is produced on the hologram recording medium 6. The interference pattern is recorded in the recording medium 6. In order to make a plurality of equivalent holograms, the recording process as shown in FIG. 1 is repeated with the recording medium 6 changed or the hologram obtained by the recording process is duplicated by contact printing. FIG. 2 shows an optical system for reconstructing a single holographic image from the plurality of holograms prepared by the above described recording process in accordance with the first embodiment of the present invention. As shown in FIG. 2, three substantially equivalent holograms 6a, 6b and 6c are located in the same orientation on a plane. Although the three holograms 6a, 6b and 6c are arranged in a line in FIG. 2, this is not the only arrangement of the holograms possible and others can be properly selected. The reconstructing beam 7 incident into the first hologram 6a is collimated and illuminates the first hologram 6a at the same angle α as that of the reference beam 4 used in the recording process as shown in FIG. 1. Part of the reconstructing beam 7 is not diffracted by the hologram 6a and passes straight therethrough as indicated at 10. The substantially undiffracted beam 10 is used as a reconstructing beam to illuminate the second hologram 6b at the same angle α. Further, part of the reconstructing beam 10 passing straight through the second hologram 6b being substantially undiffracted thereby as indicated at 13 is used as a reconstructing beam to illuminate the third hologram 6c at the same angle α. By the illumination of the three equivalent holograms 6a, 6b and 6c with the three parallel reconstructing beams 7, 10 and 13, three equivalent first-order diffraction beams 9, 12 and 15 forming equivalent virtual images 8, 11 and 14 lying on a plane are obtained. Since the three virtual images 8, 11 and 14 are on the same plane and have the same size, a single enlarged projection image 22 can be obtained on a projection plane 21 by converging the first-order diffraction beams 9, 12 and 15 by use of three equivalent lenses 17a, 17b and 17c located on a plane and making the three images focused on the plane 21 perfectly overlap with each other.

The three equivalent holograms 6a, 6b and 6c employed in the reconstruction process as shown in FIG. 2 should preferably be of phase-only type. When silver halide emulsions are used as the recording medium, the emulsions are bleached after the exposure, development and fixing by use of potassium ferricyanide solution or the like. Assuming that a He–Ne laser is used as the illuminating beam and the average angle between the reference beam 4 and the object beam 5 is 45° in the hologram recording process as shown in FIG. 1, the average spatial frequency of the interference pattern produced by the two beams 4 and 5 recorded on the recording medium as a hologram is about 1,200 lines per mm. When a recording medium has a photosensitive layer of a thickness larger than several μm, a so-called "thick" hologram is obtained and the diffraction beams are generated only in the directions in which the Bragg condition is satisfied. Therefore, in the reconstruction process as shown in FIG. 2, if the light source is the He–Ne laser used in the recording process, there are obtained only the undiffracted beams 10, 13 and 16 passing straight through the holograms 6a, 6b and 6c and the first-order diffraction beams 9, 12 and 15 forming virtual images 8, 11 and 14. Further, if the holograms are made in the form of phase-only type, absorption of the beam by the holograms is negligibly small. Further, since the reflection loss of the beam on the surface of the hologram is also small, the energy of the first-order diffraction beams can be represented as follows.

Where the total energy of the reconstructing beam 7 for illuminating the first hologram 6a is Eo and the first-order diffraction efficiency of the three equivalent holograms is $\eta d$, the energy of the first-order diffraction beam 9 from the first hologram 6a is $\eta d Eo$, the energy of the reconstructing beam 10 for illuminating the second hologram 6b is $(1-\eta d)Eo$, the energy of the first-order diffraction beam 12 from the second hologram 6b is $\eta d(1-\eta d)Eo$, the energy of the reconstructing beam 13 for illuminating the third hologram 6c is $(1-\eta d)^2 Eo$, and the energy of the first-order diffraction beam 15 from the third hologram 6c is $\eta d(1-\eta d)^2 Eo$. Accordingly, the total energy of the projection image 22 formed on the image plane 21 is the sum of the three first-order diffraction beams 9, 12 and 15, i.e. $\eta d [1+(1-\eta d)+(1-\eta d)^2]$ Eo. The first-order diffraction efficinecy $\eta d$ of the normal hologram obtained by bleaching the exposed and developed photographic emulsion prepared by the recording process as shown in FIG. 1 is about 5 percent, and accordingly, the energy contributing to formation of a holographic image is only 0.05Eo when only a single hologram is used. However, in accordance with the above described embodiment of the reconstruction process of the present invention in which three equivalent holograms are used to reconstruct a single holographic image as shown in FIG. 2, the energy contributing to formation of the holographic image is about 0.14Eo which is about three times as large as that of the beam wherein only one hologram is used.

Although the number of equivalent holograms employed in the embodiment described above is three, it is not limited thereto but can be properly selected. As mentioned above, in the phase-only hologram, it is generally easy to make only the zero-order and first-order diffraction beams. When N-number of such holograms are used and the image is reconstructed in accordance with the reconstruction process as shown in FIG. 2, the energy Ei of the first-order diffraction beam from the i-th hologram can be represented as $$Ei = \eta d (1 - \eta d)^{i-1} Eo \qquad (1)$$

where Eo is the total energy of the reconstructing beam which illuminates the first hologram and the absorption is neglected. Therefore, the total energy of the first-order diffraction beams from the N-number of holograms is represented as $$Et = \sum_{i=1}^{N} Ei = [1-(1-\eta d)^N]Eo \qquad (2).$$

Figure 3:
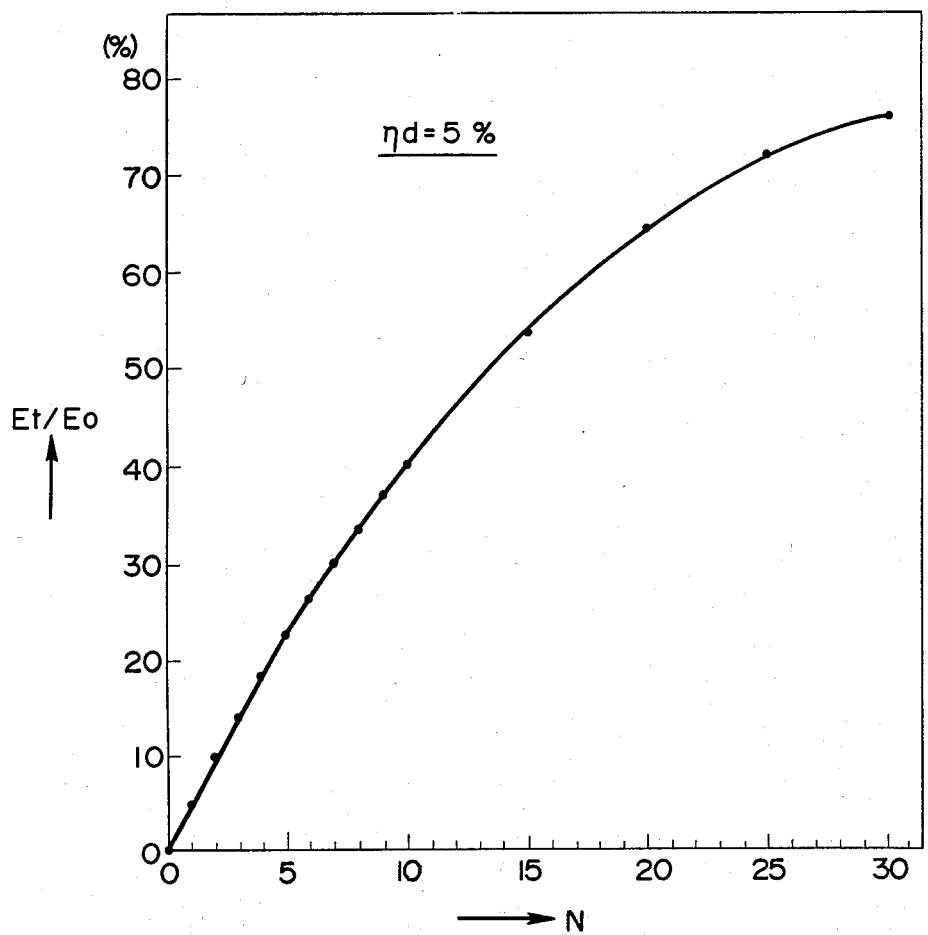
FIG. 3 is a graphical representation showing the results obtained by the method in accordance with the present invention.

Therefore, the ratio Et/Eo of the energy Et of the first-order diffraction beam contributing to the image reconstruction to the total energy Eo of the reconstructing beam can be represented as shown in the graph of FIG. 3 wherein the ratio Et/Eo is indicated in terms of percent with respect to N-number of equivalent holograms. As shown in FIG. 3, the ratio Et/Eo which is the reconstruction efficiency increases almost linearly up to N=10 where $Et/Eo$ is about 40 percent. This means that the reconstruction efficiency is markedly enhanced by using a plurality of holograms in comparison with the case of using a single hologram wherein the efficiency is only 5 percent.

Although the first embodiment has been described to use a transparency type object, it will be understood that the advantage of the present invention can also be obtained with a reflection type three dimensional object.

Further, it will be understood that the present invention can be effected with holograms which are produced by a recording process other than that shown in FIG. 1 such as Fourier transformation type holograms, Fourimaged holograms and Lippmann type holograms.

Figure 4:
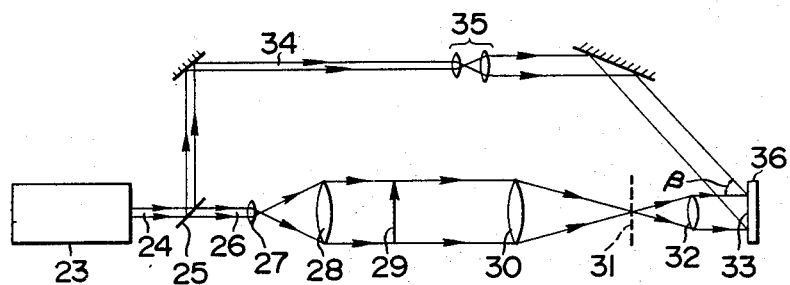
FIG. 4 is a schematic representation of an optical system for recording a hologram used in the second embodiment of the present invention for reconstructing a color holographic image.
Figure 5:
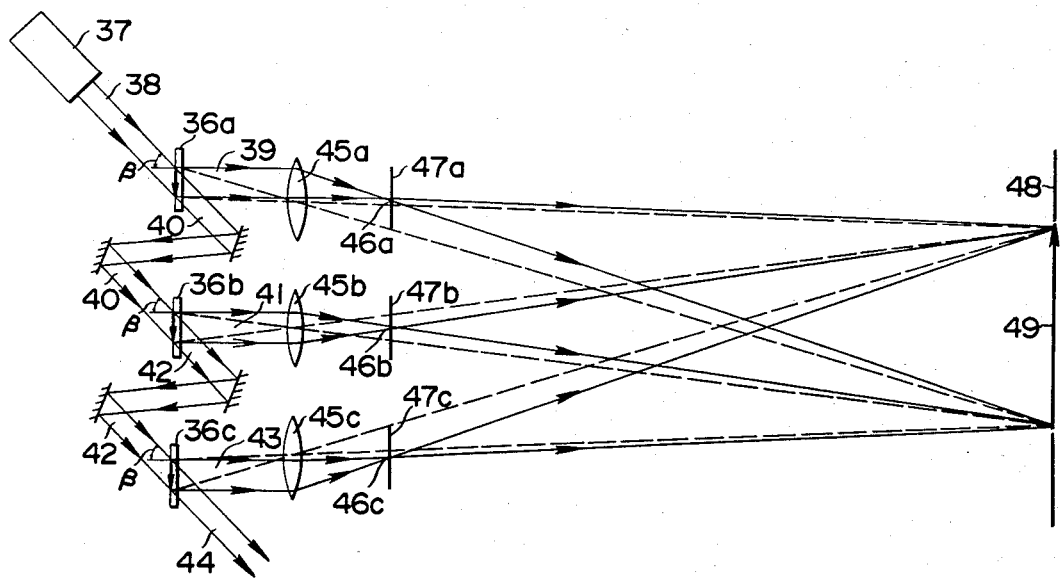
FIG. 5 is a schematic representation of an optical system for reconstructing a holographic image in accordance with the second embodiment of the invention and, FIG. 6 is a graphical representation showing the brightness of the holographic images in the present invention.

FIGS. 4 and 5 illustrate a second embodiment of the present invention in which a color image is holographically reconstructed.

It is well known that color image information can be recorded and reconstructed by use of a black and white recording medium by utilizing holography. This is considerably advantageous since black and white recording medium is much cheaper than color recording medium containing coloring agents and the photographic processes such as development and fixing are much easier in black and white photography than in color photography. In addition to these advantages black and white photography is advantageous over color photography in that there is no problem of fading of color. However, as mentioned above, it has been difficult to obtain a bright reconstruction image owing to the insufficient first-order diffraction efficiency. Therefore, it has been proposed to record holograms of Lippmann type to enable using a white light source of high brightness which can be easily obtained from, for example, a halogen lamp, a xenon short arc lamp or a mercury lamp. In case of the Lippmann type holograms, the hologram has a great wavelength selectivity owing to the Bragg effect, and accordingly, by use of the above described white light source as the reconstructing light source, it is theoretically possible to obtain a color image which is as sharp as that obtained in the case of using multicolor laser beams in the recording process. However, the Lippmann type holograms, particularly the Lippmann type holograms used for recording color information, are disadvantageous in that the wavelength which is selected by the Lippmann hologram is shifted by about 0.01 $\mu$m to the shorter wavelength side from the wavelength of the multicolor lasers used in the recording process. This is caused by the shrinkage of the photographic emulsion occurring after the exposure, development and fixing processes. Because of the shift of the wavelength, a faithful color image cannot be obtained. In order to compensate for the color shift, it is necessary to swell the emulsion. However, the thickness of the swollen emulsion layer is not stable and accordingly the recording of color information by the Lippman type hologram cannot be put into practical use for the time being.

Because of the above described situation, there is a demand for a method of reconstructing holograms wherein a color image is reconstructed from a normal type hologram, not of Lippmann type, by use of a white light source of high brightness.

The second embodiment of the present invention shown in FIGS. 4 and 5 satisfies the above mentioned requirements for reconstruction of a sharp bright color image. FIG. 4 illustrates the recording process of a hologram and FIG. 5 illustrates the color image projecting process in which a color image is reconstructed.

Referring to FIG. 4, the reference numeral 23 indicates a multicolor laser source which gives blue, green and red light, which may be a krypton ion laser or a combination of an argon ion laser and a helium-neon laser. A light beam 24 generated from the multi-color laser source 23 is divided into two light beams 26 and 34 by a beam splitter 25. The beam 26 passing straight through the beam splitter 25 is diverged by a diverging lens 27 and then collimated by a collimating lens 28 to uniformly illuminate a transparency type object 29. The beam passing through the object 29 passes through a first Fourier transformation lens 30 and forms a Fourier transformed image of the object on the secondary focal plane 31 thereof, and then passes through a second Fourier transformation lens 32 as an object beam to form a real image 33 of the object 29 on the secondary focal plane thereof on which a recording medium 36 is located. On the other hand, the beam 34 reflected by the beam splitter 25 is enlarged in diameter by a beam enlarging lens system 35 and impinges on the recording medium 36 as a reference beam at an angle of $\beta$. By the interference between the object beam from the lens 32 and the reference beam from the lens system 35 is formed an interference pattern on the recording medium 36, since the laser beams are spatially coherent. With the optical system having the above described arrangement, the wavelength of the laser beam 24 generating from the laser source 23 is selected by means of a wavelength selector so as to successively illuminate the recording medium 36 with at least three colors, blue, green and red. The recording medium 36 which has successively been exposed to the three colors is subject to development and fixing to make a color hologram. In order to produce a plurality of color holograms equivalent to the hologram prepared as described above, the above described process is repeated with changed recording media or, more simply, a plurality of equivalent holograms are produced by a technique of contact printing or the like.

FIG. 5 illustrates an optical system which reconstructs a single bright reconstruction color image from three color holograms prepared as described above. The color image reconstructed as described hereinbelow referring to FIG. 5 has a brightness much higher than that obtained with only one color hologram.

As shown in FIG. 5, three substantially equivalent holograms 36a, 36b and 36c are located in the same orientation on the same plane. Similarly to the first embodiment as shown in FIG. 2, the three holograms need not necessarily be arranged in a line. A white light beam 38 generated from a white light source 37 such as a xenon short arc lamp impinges as a reconstructing beam on the first hologram 36a at an angle $\beta$. Part of the reconstructing beam 38 is not diffracted by the first hologram 36a and passes straight therethrough as indicated at 40. The substantially undiffracted beam 40 is used as a reconstructing beam to illuminate the second hologram 36b at the same angle $\beta$. Further, part of the reconstructing beam 40 passing straight through the second hologram 36b being substantially undiffracted thereby as indicated at 42 is used as a reconstructing beam to illuminate the third hologram 36c at the same angle $\beta$. By the illumination of the three equivalent holograms 36a, 36b and 36c with the three parallel reconstructing beams 38, 40 and 42, three equivalent first-order diffraction beams 39, 41 and 43 are obtained. These three first-order diffraction beams 39, 41 and 43 are white light beams dispersed by the interference pattern recorded on the holograms and contain true diffraction light beams desired for reconstruction of a color image and crosstalk diffraction light beams causing a ghost image. By providing three equivalent lenses 45a, 45b and 45c in the optical path of the first-order diffraction beams, dispersed spectra of the true diffraction beams and the crosstalk diffraction beams in the first-order diffraction beams are formed on the secondary focal plane of the lenses. The band width of the spatial frequency spectra which are obtained as described above corresponds to the spatial frequency information of the object. Therefore, by providing spatial filters 47a, 47b and 47c having apertures 46a, 46b and 46c, respectively, of the size corresponding to the band width of the spatial frequency spectra of the object on the secondary focal plane and on the optical axes of the lenses 45a, 45b and 45c, only the true diffraction beams are selected to pass through the spatial filters 47a, 47b and 47c and a single color image 49 constituting three perfectly overlapped images is projected in an enlarged scale on a plane which is conjugate with the equivalent holograms 36a, 36b and 36c with respect to the lenses 45a, 45b and 45c.

Similarly to the first embodiment, the equivalent holograms 36a, 36b and 36c employed in the second embodiment as shown in FIG. 5 should preferably be of phase-only type. The number of the holograms used here is not limited to three. Further, the brightness of the reconstructed image increases linearly as the number of holograms increases up to about 10. The mode of increase in the brightness of the reconstructed image with respect to the number N of the holograms is qualitatively the same as that shown in FIG. 3.

Figure 6:
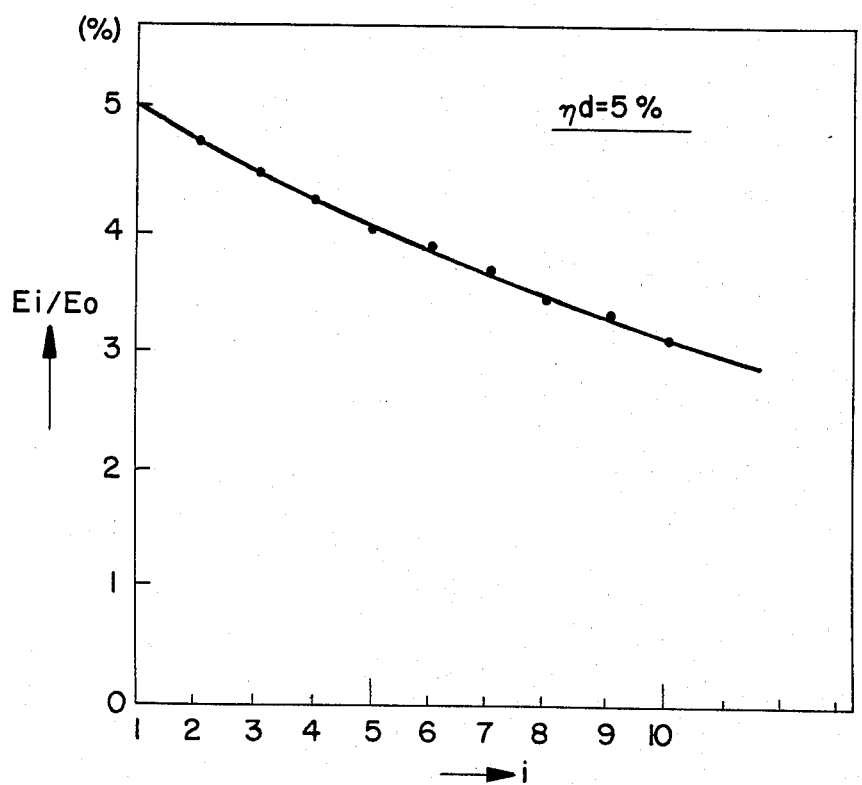

Since the energy $E_i$ of the first-order diffraction beam obtained from the $i$-th hologram is represented by the formula (1), where the energy of the reconstructing beam illuminating the first hologram is $E_o$ and the first-order diffraction efficiency of the total hologram is $\eta_d$, the brightness of the image obtained from the $i$-th hologram is always lower than that of the image obtained from the $(i-1)$-th hologram. In FIG. 6, the ratio of the energy of the first-order diffraction beam $E_i$ contributing to the reconstruction of the $i$-th hologram to the total energy of the reconstructing beams $E_o$, i.e. $E_i/E_o$, represented in terms of percent is plotted with respect to the first to the tenth holograms, where $\eta_d = 5$ percent. The brightness of the holographic image of the third hologram is about 10 percent lower than that of the first hologram, and that of the fifth hologram is about 20 percent lower than that of the first. Therefore, there is no problem in a practical sense if the number of holograms used is from 3 to 5.

I claim:

1. A method of reconstructing a holographic image on an image-focusing plane by focusing first-order diffracted beams from holograms comprising the steps of:

preparing a plurality of substantially identical holograms of an object;

arranging said plurality of substantially identical holograms located in a plane with spaces therebetween which spaces are large enough to unobstructedly pass a first-order diffracted beam from each said hologram to an image-focusing plane;

impinging a reconstructing beam onto a first one of said holograms; impinging the undiffracted beam passing through said first one onto a second one of said holograms;

focusing a first-order diffracted beam from said first one onto the image-focusing plane;

repeating the steps of impinging the undiffracted beam from a prior one of said holograms onto the next succeeding one of said holograms and focusing the first-order diffracted beam from said prior one onto a focusing plane until the undiffracted beam impinges on the last one of said holograms, said first-order diffracted beams from holograms being focused in the same region of the focusing plane so that the images reconstructed by the diffracted beams from different holograms are substantially registered with each other, whereby a single image of increased brightness is reconstructed.

2. A method of reconstructing a holographic image as defined in claim 1 further comprising the steps of arranging the plurality of substantially identical holograms in parallel to each other with spaces therebetween which spaces are large enough to unobstructedly pass the first-order diffracted beam from one hologram to the image-focusing plane, and converging the first-order diffracted beams onto the image-focusing plane by use of converging lenses to form substantially identical focused images substantially registered with each other on the focusing plane.

3. A method of reconstructing a holographic image as defined in claim 1 wherein said holograms are substantially identical holograms, each of said holograms containing information corresponding to a plurality of different independently recorded colors in the object, and white light is used as said reconstruction beam impinged on the first hologram, whereby a multi-color image of increased brightness is reconstructed on the focusing plane.

4. A method of reconstructing a holographic image as defined in claim 3 further comprising the steps of arranging the color holograms in parallel to each other, impinging the undiffracted beams on the holograms at the same angle as that at which said reconstruction beam impinges on the first one of said plurality of substantially identical holograms, and converging the first-order diffracted beams onto the image-focusing plane by use of converging lenses to form substantially identical focused color images perfectly registered with each other on the focusing plane.

5. A method of reconstructing a holographic image as defined in claim 4 further comprising the step of passing each of said first-order diffracted beams from holograms through a spatial filter having an aperture of the size corresponding to the band width of the spatial frequency spectra of the object on the secondary focal plane and on the optical axis of said converging lenses.

* * * * *